Oct. 6, 1964  J. H. GODSEY  3,152,027
HEAT-RESISTANT PROPELLANTS
Filed May 29, 1962

METHOD FOR PRODUCING
HEAT-RESISTANT PROPELLANT

JAMES H. GODSEY
INVENTOR.

BY Ernest G. Peterson
AGENT

United States Patent Office 3,152,027
Patented Oct. 6, 1964

---

3,152,027
HEAT-RESISTANT PROPELLANTS
James H. Godsey, Kenvil, N.J., assignor to Hercules
Powder Company, Wilmington, Del., a corporation of
Delaware
Filed May 29, 1962, Ser. No. 198,482
10 Claims. (Cl. 149—83)

This invention relates to the manufacture of propellants and more particularly to a method for the manufacture of granulated heat-resistant propellants and to a new article of manufacture obtained therefrom.

Generally described, this invention relates to heat-resistant propellant compositions containing a curable rubber binder and an inorganic oxygen-rich oxidizer along with suitable curing agents. One aspect of the invention relates to propellants which will withstand soak temperatures as high as 500° F. without ignition, distortion, or excessive degradation. Another aspect relates to a method whereby small propellant grains, including those of multi-perforated geometry, are solvent-extruded in the desired configuration, granulated, and vulcanized during and after solvent-removal. Still another aspect pertains to solid propellants which are especially suitable for cartridge-actuated and small gas-generating devices by virtue of their multiperforated geometry and their ability to withstand high soak temperatures such as those that might be encountered near missile skin surfaces, in aircraft compartments, and in deep oil wells.

Accordingly, the objects of this invention are to provide a novel propellant composition of exceptional resistance to heat, from the standpoints of both thermal stability and physical integrity; to produce propellants which are particularly suitable for cartridge-actuated devices; and to provide a new process for manufacture of heat-resistant propellants.

Other aspects and objects of the invention will appear hereinafter, the novel features and combinations being set forth in the appended claims.

Figure 1:
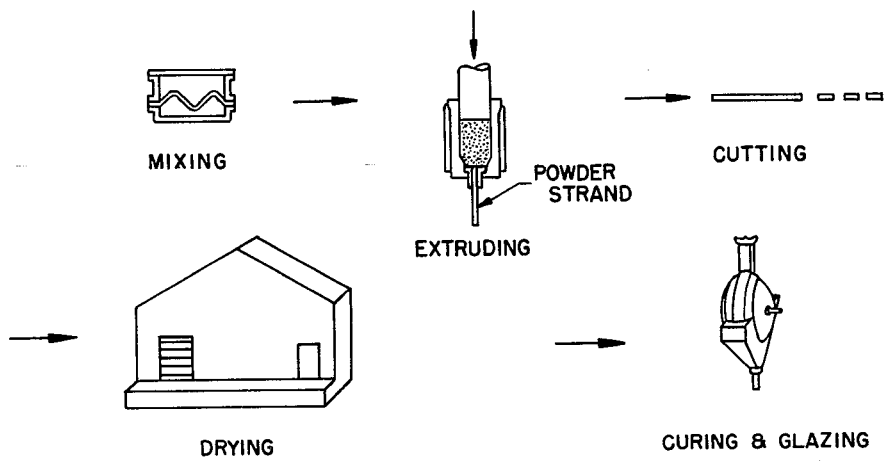

Now in accordance with the present invention, a method has been discovered which permits achievement of the aspects and objects of the invention in a simple and facile manner using manufacturing equipment such as that conventionally used in the manufacture of smokeless powder. Moreover, in conjunction with this conventional equipment, the procedure of the present invention simply involves mixing, extruding, cutting, drying and curing with glazing, if desired, to produce the products of this invention. This is diagrammatically shown in FIGURE 1.

More specifically, the present invention provides a method for the manufacture of granulated propellant having high heat resistant which comprises forming a uniform doughy mixture of from about 70 to about 90% of particulate potassium perchlorate and from about 10 to about 30% of curable polyacrylic rubber in the presence of volatile solvent therefor which is capable of desensitizing the mixture; extruding and cutting the mixture into desired granules; drying the granules at about the temperature of the boiling point of the volatile solvent; and then curing the granules at a temperature above the boiling point of the volatile solvent to form a cured granulated propellant substantially free of said volatile solvent, all percentages by weight of the cured granulated propellant. The invention further provides for the obtention of novel granulated propellant from the method hereinbefore described with the following examples serving to demonstrate more fully both the method and its products.

EXAMPLE 1

High temperature resistant propellant was prepared using the following formulation:

| Ingredients | Wt., percent | Wt., gms. |
|---|---|---|
| Potassium perchlorate (−100 mesh) | 80.0 | 1,200.0 |
| Hycar 4021 [1] | 19.4 | 291.0 |
| DMP-30 [2] | 0.4 | 6.0 |
| Sulfur (Fine) [3] | 0.2 | 3.0 |
| Total | 100.0 | 1,500.0 |

[1] Hycar 4021 is a polyacrylic rubber copolymer produced by reacting a mixture consisting of 95% ethyl acrylate and 5% chloroethyl vinyl ether by weight.
[2] DMP-30 is tri(dimethylamino)methyl phenol.
[3] Sulfur (Fine) has the following U.S. sieve analysis:

Sieve Size (mesh):                         Percent retained
80 _____ 1
100 _____ 1
140 _____ 7
200 _____ 26
325 _____ 33
Pan _____ 32

The method of preparation was as follows:

The Hycar 4021 was placed in a Bramley Mill heated to a temperature of 120° F. and was mixed for 10 minutes. The sulfur and DMP-30 were then added, and the mixing was continued until these ingredients were thoroughly incorporated. Following this, the potassium perchlorate was added in two increments with each increment being wet down with 75 grams of acetone, utilizing a mixing cycle of 10 minutes for the addition of each increment. The mixture thus formed was mixed for an additional 60 minutes at 120° F. after which the mixture was removed and placed in a 2-inch extrusion press which had been warmed to a temperature of 180° F. The mixture was then extruded through a 0.219″−0.014° (7 pin) die and was granulated to 1.96 cuts per inch on a small arms cutter. The granules (7 perforations) were then sent to a dry house and dried for 24 hours at room temperature and then for 24 hours at a temperature of 131° F. After this, the granules were cured 6 hours at a temperature of 200° F. in a rotating sweetie barrel.

With reference to the foregoing preparation, the total solvent utilized was 10 parts of acetone per 100 parts of propellant mixture, and the extrusion pressure was 400 p.s.i. No difficulty was encountered in granulating on a conventional small arms cutter. The moisture and volatiles after drying amounted to 0.04% by weight of the granules. The properties of this high temperature resistant propellant are given in Table I.

EXAMPLE 2

Another high temperature resistant propellant was prepared using the following formulation:

| Ingredients | Wt., percent | Wt., gms. |
|---|---|---|
| Potassium perchlorate (−100 mesh) | 87.50 | 1312.5 |
| Hycar 4021 [1] | 12.12 | 181.8 |
| DMP-30 [2] | 0.25 | 3.8 |
| Sulfur (Fine) [3] | 0.13 | 1.9 |
| Total | 100.0 | 1500.0 |

[1] Hycar 4021 is a polyacrylic rubber copolymer produced by reacting a mixture consisting of 95% ethyl acrylate and 5% chloroethyl vinyl ether by weight.
[2] DMP-30 is tri(dimethylamino)methyl phenol.
[3] Sulfur (Fine) has the following U.S. sieve analysis:

| Sieve Size (mesh): | Percent retained |
|---|---|
| 80 | 1 |
| 100 | 1 |
| 140 | 7 |
| 200 | 26 |
| 325 | 33 |
| Pan | 32 |

The method of preparation was as follows:

The Hycar 4021 was placed in a Bramley Mill and mixed at a temperature of 120° F. until the Hycar was broken up into small pieces. The sulfur and DMP-30 were then added, and the mixing continued until these ingredients were thoroughly incorporated. The potassium perchlorate was then added in two increments with each increment wet down with 75 grams of acetone, and the mixing cycle for each increment was 10 minutes. Mixing was continued for an additional 60 minutes at 120° F. after which the mixture was placed in a 2-inch extrusion press which had been warmed to a temperature of 180° F. The mixture was extruded through a 0.219″–0.014° (7 pin) die and granulated to 1.96 cuts per inch on a small arms cutter. The granules (7 perforations) thus formed were then placed in a dry house and dried for 24 hours at room temperature followed by drying for 24 hours at 131° F. After this, the granules were cured for 6 hours at a temperature of 200° F. in a rotating sweetie barrel.

With reference to the foregoing preparation, the total solvent utilized was 10 parts of acetone per 100 parts of the mixture. In this instance, it was found that the mixture was slightly over-solvated, and the mixer was operated with the lid open for 3 minutes to remove the excess solvent. This mixture was extruded at a pressure of 1900 p.s.i. and was cut easily on a small arms cutter. The moisture and volatiles after drying amounted to 0.08% by weight of the granules. The properties of this high temperature resistant propellant are given in Table I.

EXAMPLE 3

Still another high temperature resistant propellant was prepared using the following formulation:

| Ingredients | Wt., percent | Wt., gms. |
|---|---|---|
| Potassium perchlorate (−100 mesh) | 84.0 | 1,260.0 |
| Hycar 4021 [1] | 15.0 | 225.0 |
| Trimene Base [2] | 1.0 | 15.0 |
| Total | 100.0 | 1,500.0 |

[1] Hycar 4021 is a polyacrylic rubber copolymer produced by reacting a mixture consisting of 95% ethyl acrylate and 5% chloroethyl vinyl ether by weight.
[2] Trimene Base is a liquid reaction product of ethyl chloride, ammonia and formaldehyde.

The method of preparation was as follows:

The Hycar 4021 was placed in a Bramley Mill heated to a temperature of 120° F. and was mixed until well macerated. The Trimene Base was then added and mixing was continued for 10 minutes. After this, the potassium perchlorate was added in two increments, each of which was wet down with 75 grams of acetone, utilizing a mixing cycle of 10 minutes between each add. Mixing was continued for an additonal 30 minutes after which the sides of the mixing bowl were scraped down, and the mixing was continued for another 30 minutes. The mixture was then placed in a 2-inch extrusion press and was extruded at 70° F. through a 0.053″ die and was granulated with 98 cuts per inch under an ethanol/water 50/50 bath. The granules (unperforated) thus formed were placed in a dry house and dried for two days at 130° F. The dried granules were then cured in a rotating sweetie barrel for 6 hours at a temperature of 200° F. wherein 0.1% graphite was added after 4–5 hours of mixing. The moisture and volatiles after drying were 0.34%. The properties of this high temperature resistant propellant are given in Table I.

Table I
PROPERTIES OF HEAT RESISTANT PROPELLANTS

| Examples | 1 | 2 | 3 |
|---|---|---|---|
| Physical Properties: | | | |
| Solid density (gm./cc.) | 1.89 | 1.82 | 2.07 |
| Bulk density (gm./cc.) | | | 0.78 |
| Granulation, nominal (inches) | 0.219 x 0.014° (7) x 0.510 | 0.202 x 0.014° (7) x 0.510 | 0.053 x 0.01 |
| Heat of explosion, cal./gm | 1268 | 1380 | 1091 |
| Strand Bomb Data: | | | |
| Burning rate, 1,000 p.s.i.g. at 70° F. on 0.125 inch diameter strands (in./sec.) | 0.68 | 0.71 | 0.64 |
| Pressure exponent, $n$ | 1.0 | 0.7 | 0.81 |
| Thermodynamic Properties (Approx.): | | | |
| Moles total products/gram propellant | .024 | .023 | .023 |
| Moles gas/gram propellant | .018 | .017 | .017 |
| Flame temperature, $T_v$ (° K.) | 3890 | 3584 | 3584 |
| Impetus, F (ft.-lbs./lb.) | 197,265 | 169,061 | 169,061 |

With reference to the foregoing examples and table, it will be seen that the granulated propellants obtained in accordance with the invention can be produced in a simple and facile manner and are possessed of good physical and thermodynamic properties. There now follows a showing of the thermal stability of these propellants in Table II with the propellant of Example 3 being chosen for purposes of illustration.

Table II
THERMAL STABILITY

| Temperature (° F.) | Exposure Time (hrs.) | Weight Loss (percent) |
|---|---|---|
| 300 | 4 | 0.4 |
| | 24 | 0.4 |
| | 96 | 0.4 |
| 400 | 4 | |
| | 24 | 1.2 |
| | 96 | 10.0 |
| 500 | 4 | 11.8 |
| | 24 | 14.5 |
| | 96 | 16.8 |

Figure 2:
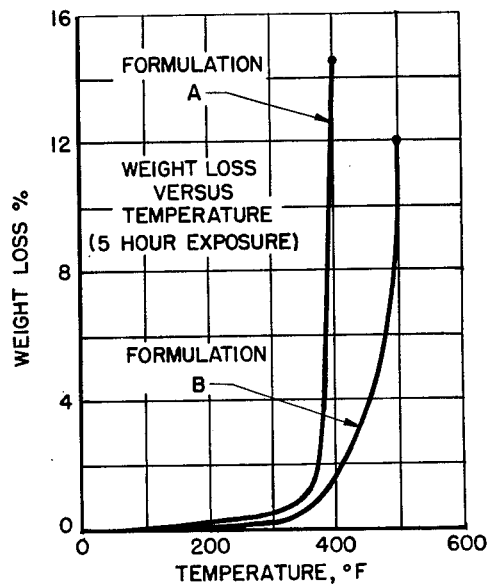

Although ammonium perchlorate has frequently been used where high temperature, stable oxidizers are desired, in view of its high gas output, it has been found that to substitute this material in the present invention interferes with the curing or crosslinking reaction and in addition, considerably reduces the temperature resistance of the propellant. This later condition is most evident with reference to FIGURE 2 where the following formulations are compared in graph form.

| Ingredients | Formulations, Wt. percent | |
| --- | --- | --- |
| | A | B |
| Ammonium perchlorate | 84.00 | |
| Potassium perchlorate | | 84.00 |
| Hycar 4021 | 15.55 | 15.55 |
| DMP-30 | 0.35 | 0.35 |
| Sulfur | 0.10 | 0.10 |
| Total | 100.00 | 100.00 |

Particulate potassium perchlorate as utilized in accordance with this invention provides a source of very stable inorganic oxidizer having the additional attribute of a rather consistent range of particle size which leads to satisfactory reproducibility of the burning characteristics of the granulated propellant. For ease of extrusion and reproducibility, it is preferred, however, that the potassium perchlorate have a particle size of substantially all through a 100 mesh U.S. series sieve. The preferred curable polyacrylic rubber is a copolymer produced by reacting a mixture consisting of 95% ethyl acrylate and 5% chloroethyl vinyl ether, by weight. This material is readily solvated by well known and economic volatile solvents such as acetone, methyl ethyl ketone and methyl isobutyl ketone with acetone preferred. However, the curable polyacrylic rubber may be varied in amount and essentially consists of from about 95 to about 99% ethyl acrylate and from about 1 to about 5% chloroethyl vinyl ether.

The selection of volatile solvent will, of course, dictate certain operating temperatures for the process; since a feature of the invention resides in having at least some solvent present to desensitize the propellant mixture up to the final stages of manufacture. For example, the polyacrylic rubber becomes harder with decreasing temperatures and requires a larger mixing cycle for thorough maceration. Thus, when using acetone, the preferred operating range is from 100° F. to 132° F. and when using methyl ethyl ketone, the preferred operating range is from 100° F. to 176° F., where in each instance the upper operating temperature is dictated by the approximate normal boiling point of the solvent being used. Generally, the amount of volatile solvent utilized will be about 10% by weight of the propellant formulation, but this may be varied from about 7 to about 15% depending more particularly upon the exact formula utilized, oxidizer particle size, and mix temperature. In selecting the type and amount of solvent, it will be appreciated that the volatile solvent serves to desensitize the oxidizer and the propellant mixture as well as to make the propellant mixture more dough-like and thereby easier to mix and extrude.

The curing agents which may be employed in accordance with this invention include well known materials such as Trimene Base, which is a reaction product of ethyl chloride, ammonia and formaldehyde; DMP-30, which is tri(dimethylamino)methyl phenol; and triallyl cyanurate. These materials are used in an amount of from about 0.5 to about 2.0% by weight of the propellant formulation. When sulfur is included, it is usually incorporated in an amount of from about 0.1 to about 0.5% by weight of the propellant formulation.

The drying and curing temperatures utilized in accordance with this invention and the drying and curing times are dependent on such factors as the solvents being utilized, the formulation and size of the granules, the number of perforations, and the like, with the important features of the invention residing in that the granules should be dried at about the temperature of the boiling point of the volatile solvent utilized and that the granules should be cured at a temperature above the boiling point of the volatile solvent utilized. Ordinarily, drying is accomplished in about 2 days at a temperature of about or slightly below the normal boiling point of the solvent utilized, while curing is accomplished in about 6 hours at a temperature of about 200° F., while tumbling in a sweetie barrel, as demonstrated by the examples.

It will be appreciated that the method of this invention and the granulated propellant resulting therefrom are intimately related and that a granulated propellant composition based on the formulations herein given, without practicing the method, will not necessarily yield a suitable propellant for a cartridge-actuated device which represents one of the fields of utility where this invention has been demonstrated. This has so been found particularly for the manufacture of multiperforated propellant where it is desired to use conventional equipment such as that used for the manufacture of double base smokeless powders. In the absence of practicing the method steps of this invention, it has been found that reliable and reproducible results cannot be obtained for the manufacture of granulated propellant having high heat resistance.

As previously set forth, the propellants of this invention may be manufactured utilizing conventional smokeless powder equipment and in granule or grain size and with perforations similar thereto. Moreover, the diameter of the grains is not necessarily limited providing the grain web does not exceed about 0.5 inch. Thus, substantially the same parameters for grain size and web exist as between the invention and the conventional solvent process for the manufacture of smokeless powder since it has long been recognized that in drying conventional propellants with large webs, grain porosity usually results, and the drying time becomes inordinately long.

Furthermore, it will be appreciated that additives may be used in conjunction with the present invention, such as, aluminum, boron, lead, carbon black, and the like, provided such materials are incorporated in particulate form and small amount, ordinarily not exceeding from about 5 to about 10% of the propellant weight. Moreover, a wide variety of conventional coating agents may be used of which graphite has been demonstrated.

The utility and advantage for this invention are to be found in many applications requiring low and high temperature resistance of from about −65° F. to about 500° F. and include: small gas generators, cartridge-actuated devices, thrusters and rockets; oil well perforating guns; squibs, primers and igniters; gun propellants; and molding powder for shaped charges.

Since modifications of the invention will be apparent to those skilled in the art, it is intended that the scope of the invention be limited only by the appended claims.

What I claim and desire to protect by Letters Patent is:

1. A method for the manufacture of granulated propellant having high heat resistance which comprises in combination the following steps in the order named: (a) forming a uniform doughy mixture of from about 70 to about 90% of particulate potassium perchlorate and from about 10 to about 30% of curable polyacrylic rubber essentially consisting of from about 95 to about 99% ethyl acrylate and from about 1 to about 5% chloroethyl vinyl ether in the presence of volatile solvent therefor which is capable of desensitizing the mixture; (b) extruding and cutting the mixture into desired granules; (c) then drying the granules at about the temperature of the boiling point of the volatile solvent; (d) and then curing the granules at a temperature above the boiling point of the volatile solvent to form a cured granulated propellant substantially free of said volatile solvent, all percentages by weight of the cured granulated propellant.

2. The method of claim 1 in which the particulate potassium perchlorate has a particle size of substantially all through a 100 mesh sieve.

3. The method of claim 1 in which the curable polyacrylic rubber is a copolymer consisting essentially of 95% ethyl acrylate and 5% chloroethyl vinyl ether, by weight.

4. The method of claim 1 in which from about 0.5 to about 2.0% by weight of a reaction product consisting essentially of ethyl chloride, ammonia and formaldehyde is incorporated as curing agent for the polyacrylic rubber.

5. The method of claim 1 in which from about 0.1 to about 0.5% by weight of particulate sulfur and from about 0.5 to about 2.0% by weight of a reaction product consisting essentially of ethyl chloride, ammonia and formaldehyde are incorporated as curing agent for the polyacrylic rubber.

6. The method of claim 1 in which from about 0.5 to about 2.0% of tri(dimethylamino)methyl phenol is incorporated as curing agent for the polyacrylic rubber.

7. The method of claim 1 in which from about 0.1 to about 0.5% by weight of particulate sulfur and from about 0.5 to about 2.0% by weight of tri(dimethylamino) methyl phenol are incorporated as curing agent for the polyacrylic rubber.

8. The method of claim 1 in which the volatile solvent is acetone and is present in an amount of from about 7 to about 15% by weight.

9. The method of claim 1 in which the volatile solvent is methyl ethyl ketone and is present in an amount of from about 7 to about 15% by weight.

10. As a new article of manufacture, granulated propellant formed in accordance with the method of claim 1.

References Cited in the file of this patent
UNITED STATES PATENTS

| | | |
|---|---|---|
| 2,622,277 | Bonell et al. | Dec. 23, 1952 |
| 3,014,796 | Long et al. | Dec. 26, 1961 |
| 3,041,216 | Bice | June 26, 1962 |